United States Patent
Martin et al.

(10) Patent No.: US 10,001,201 B2
(45) Date of Patent: Jun. 19, 2018

(54) AXLE ASSEMBLY WITH INTERAXLE DIFFERENTIAL SUPPORT

(71) Applicant: ArvinMeritor Technology, LLC, Troy, MI (US)

(72) Inventors: Robert J. Martin, Newark, OH (US); Brian D. Hayes, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days. days.

(21) Appl. No.: 15/347,426

(22) Filed: Nov. 9, 2016

(65) Prior Publication Data

US 2018/0128361 A1 May 10, 2018

(51) Int. Cl.
*F16H 48/08* (2006.01)
*B60K 17/36* (2006.01)
*F16H 48/40* (2012.01)

(52) U.S. Cl.
CPC ............ *F16H 48/08* (2013.01); *B60K 17/36* (2013.01); *F16H 48/40* (2013.01); *F16H 2048/085* (2013.01)

(58) Field of Classification Search
None
See application file for complete search history.

(56) References Cited

U.S. PATENT DOCUMENTS

| | | | | |
|---|---|---|---|---|
| 2,771,791 A * | 11/1956 | Bachman | ............... | F16H 48/08 475/247 |
| 2,997,898 A * | 8/1961 | Ellis | ............... | F16H 3/663 475/139 |
| 4,452,331 A | 6/1984 | Lunn et al. | | |
| 5,304,103 A * | 4/1994 | Schlosser | ............... | F16H 48/08 475/230 |
| 5,823,908 A * | 10/1998 | Stefanek | ............... | F16H 48/08 475/230 |
| 6,190,281 B1 * | 2/2001 | Oates | ............... | F16H 48/08 475/230 |
| 6,581,745 B2 | 6/2003 | Kanazawa | | |
| 6,884,196 B1 * | 4/2005 | Ziech | ............... | B60K 17/16 475/230 |
| 6,918,851 B2 | 7/2005 | Ziech et al. | | |
| 7,211,017 B2 | 5/2007 | Green et al. | | |
| 7,749,124 B2 | 7/2010 | Nakajima | | |

FOREIGN PATENT DOCUMENTS

| | | | | |
|---|---|---|---|---|
| DE | 19647062 A1 * | 5/1998 | ............ | F16H 48/08 |
| DE | 102008063107 A1 * | 7/2010 | ............ | F16H 48/08 |
| DE | 102013102738 A1 * | 9/2014 | ............ | F16H 48/22 |
| WO | 2004009392 A1 | 1/2004 | | |

OTHER PUBLICATIONS

United States Patent and Trademark Office, U.S. Appl. No. 14/719,977, filed May 22, 2015.

* cited by examiner

*Primary Examiner* — Dirk Wright
(74) *Attorney, Agent, or Firm* — Brooks Kushman P.C.

(57) ABSTRACT

An axle assembly having an interaxle differential unit. The interaxle differential unit may operatively connect an input shaft to a drive pinion and an output shaft. The interaxle differential unit may include a spider that may be rotatable with respect to the output shaft. The spider may be supported by the drive pinion and may be rotatable with respect to the drive pinion.

20 Claims, 6 Drawing Sheets

AXLE ASSEMBLY WITH INTERAXLE DIFFERENTIAL SUPPORT

TECHNICAL FIELD

This disclosure relates to an axle assembly in which the spider of an interaxle differential unit is supported by a drive pinion.

BACKGROUND

An interaxle differential having a spider coupled to an input shaft is disclosed in PCT International Patent Publication No. WO 2004/009392.

SUMMARY

In at least one embodiment, an axle assembly is provided. The axle assembly may include an input shaft, a drive pinion, an output shaft, and an interaxle differential unit. The drive pinion may be spaced apart from the input shaft. The output shaft may extend through the drive pinion. The interaxle differential unit may operatively connect the input shaft to the drive pinion and the output shaft. The interaxle differential unit may include a spider that may be rotatable with respect to the output shaft. The output shaft may extend through the spider. The spider may be supported by the drive pinion and may be rotatable with respect to the drive pinion.

In at least one embodiment, an axle assembly is provided. The axle assembly may include an input shaft, a drive pinion, an output shaft, an interaxle differential unit, and a stabilizer bearing. The input shaft may be rotatable about an axis. The drive pinion may be spaced apart from the input shaft and may be rotatable about the axis. The output shaft may extend through the drive pinion and may be rotatable about the axis. The interaxle differential unit may operatively connect the input shaft to the drive pinion and the output shaft. The interaxle differential unit may include a spider. The spider may include an annular spider body and an annular spider flange. The annular spider body may be axially positioned between the input shaft and the drive pinion. The annular spider flange may extend from the annular spider body away from the input shaft. The stabilizer bearing may be received in the annular spider flange and may extend from the annular spider flange to the drive pinion. The stabilizer bearing may rotatably support the spider.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
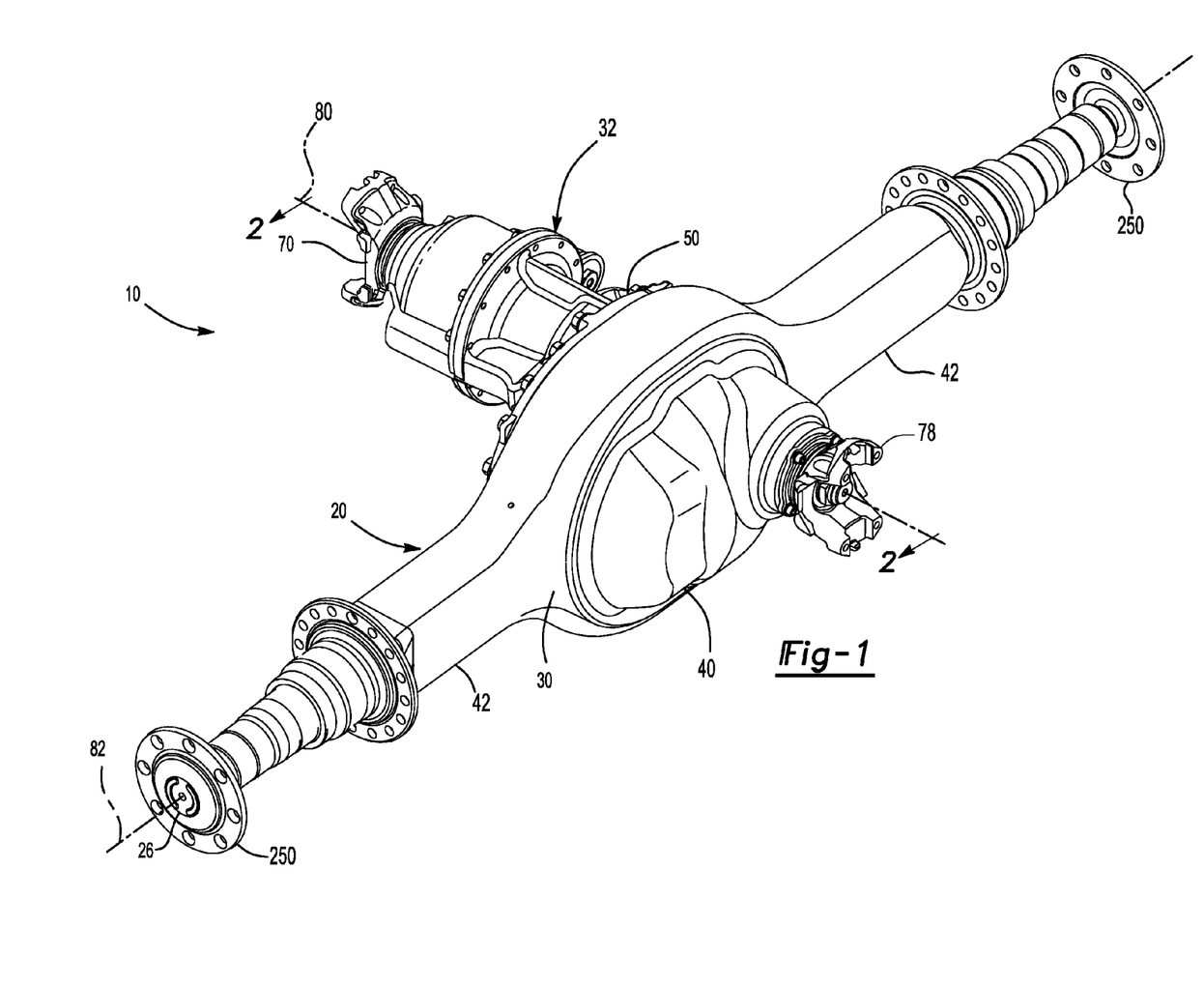
FIG. 1 is a perspective view of an axle assembly having a differential carrier that supports a differential assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1 and 2, the axle assembly 10 may include a housing assembly 20, an interaxle differential unit 22, a differential assembly 24, and at least one axle shaft 26.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

The axle housing 30 may receive and support the axle shafts 26. In at least one embodiment, the axle housing 30 may include a center portion 40 and at least one arm portion 42.

The center portion 40 may be disposed proximate the center of the axle housing 30. The center portion 40 may define a cavity that may receive the differential assembly 24. A lower region of the center portion 40 may at least partially define a sump portion that may contain lubricant. Splashed lubricant may flow down the sides of the center portion 40 and may flow over internal components of the axle assembly 10 and gather in the sump portion.

The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

One or more arm portions 42 may extend from the center portion 40. For example, two arm portions 42 may extend in opposite directions from the center portion 40 and away from the differential assembly 24. The arm portions 42 may have substantially similar configurations. For example, the arm portions 42 may each have a hollow configuration or tubular configuration that may extend around the corresponding axle shaft 26 and may help separate or isolate the axle shaft 26 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 26.

Figure 2:
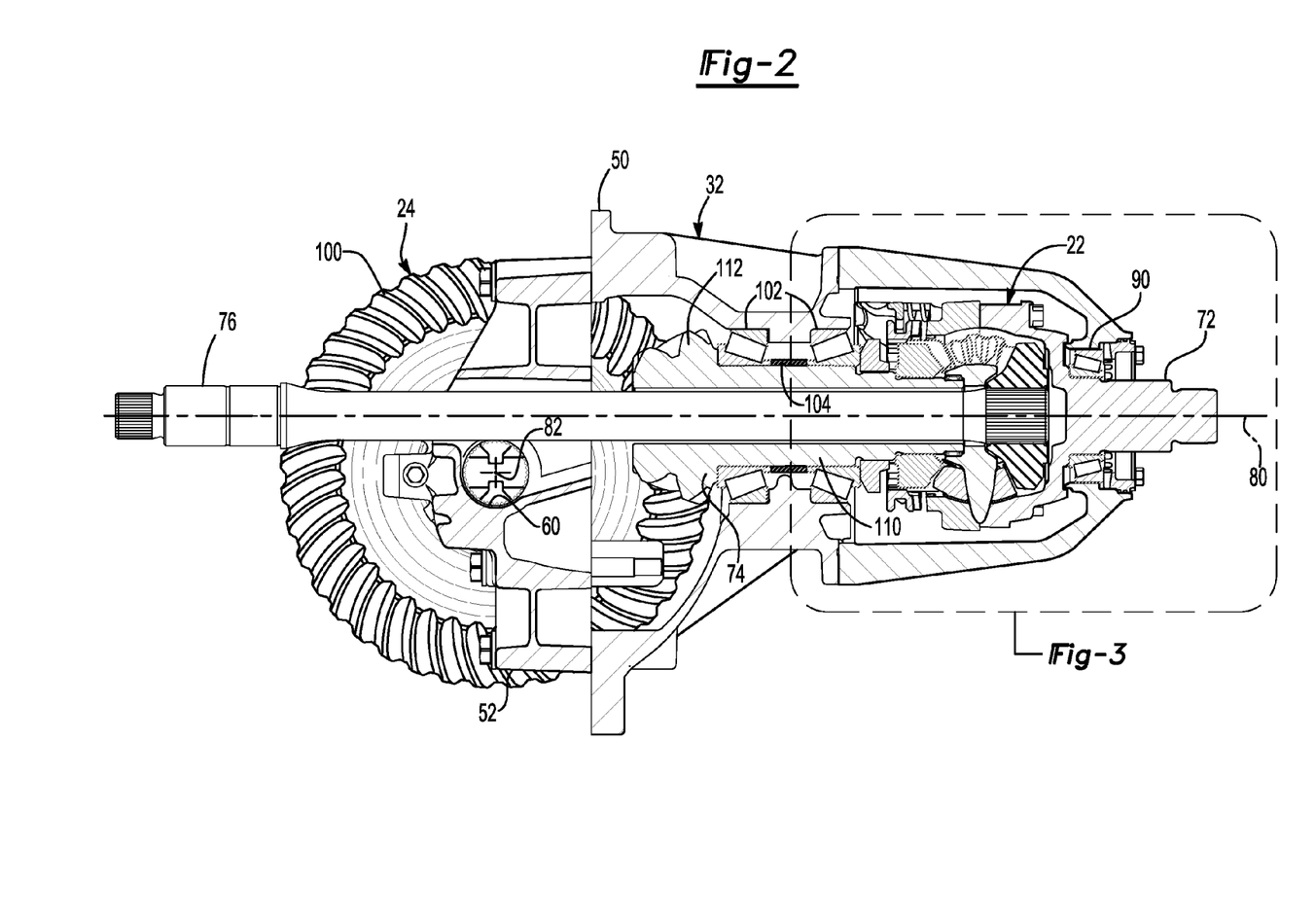
FIG. 2 is a section view of the differential carrier along section line 2-2.

Referring to FIGS. 1 and 2, the differential carrier 32, which may also be called a carrier housing, may be mounted to the center portion 40 of the axle housing 30. The differential carrier 32 may receive the interaxle differential unit 22 and support components of the differential assembly 24. The differential carrier 32 may be configured as a single component or as multiple components that are assembled to each other. For instance, the differential carrier may include a first portion that is mounted to the axle housing 30 and a second portion that is mounted to the first portion that may receive the interaxle differential unit 22. As is best shown in FIG. 2, the differential carrier 32 may have a flange portion 50 and one or more bearing supports 52.

Referring to FIGS. 1 and 2, the flange portion 50 may facilitate mounting of the differential carrier 32 to the axle housing 30. For example, the flange portion 50 may be disposed on the carrier mounting surface of the axle housing 30 and may have a set of holes that may receive fasteners as previously discussed.

Referring to FIG. 2, the bearing support 52 may receive a roller bearing assembly 60 that may rotatably support the differential assembly 24. For example, two bearing supports 52 may be received in the center portion 40 and may be located proximate opposite sides of the differential assembly 24. The bearing support 52 may be provided in various configurations. For example, a bearing support 52 may include a pair of legs that extend from the differential carrier 32. A bearing cap may be mounted to the legs and may arch over a roller bearing assembly 60. In such a configuration, the bearing support 52 and bearing cap may cooperate to extend around, receive, and secure the roller bearing assembly 60. As another example, the bearing support 52 may be received in a roller bearing assembly 60 which in turn may support the differential assembly 24.

Referring to FIGS. 1-4, additional components that may be associated with the differential assembly 24 may include an input yoke 70, an input shaft 72, a drive pinion 74, an output shaft 76, and an output yoke 78.

Referring to FIG. 1, the input yoke 70 may facilitate coupling of the axle assembly 10 to a torque source. For example, the input yoke 70 may be coupled to the drive shaft. The input yoke 70 may be disposed on the input shaft 72, the input shaft 72 being best shown in FIG. 2. For example, the input yoke 70 may have an opening that receives the input shaft 72 and may be secured to the input shaft 72 with a nut.

Figure 3:
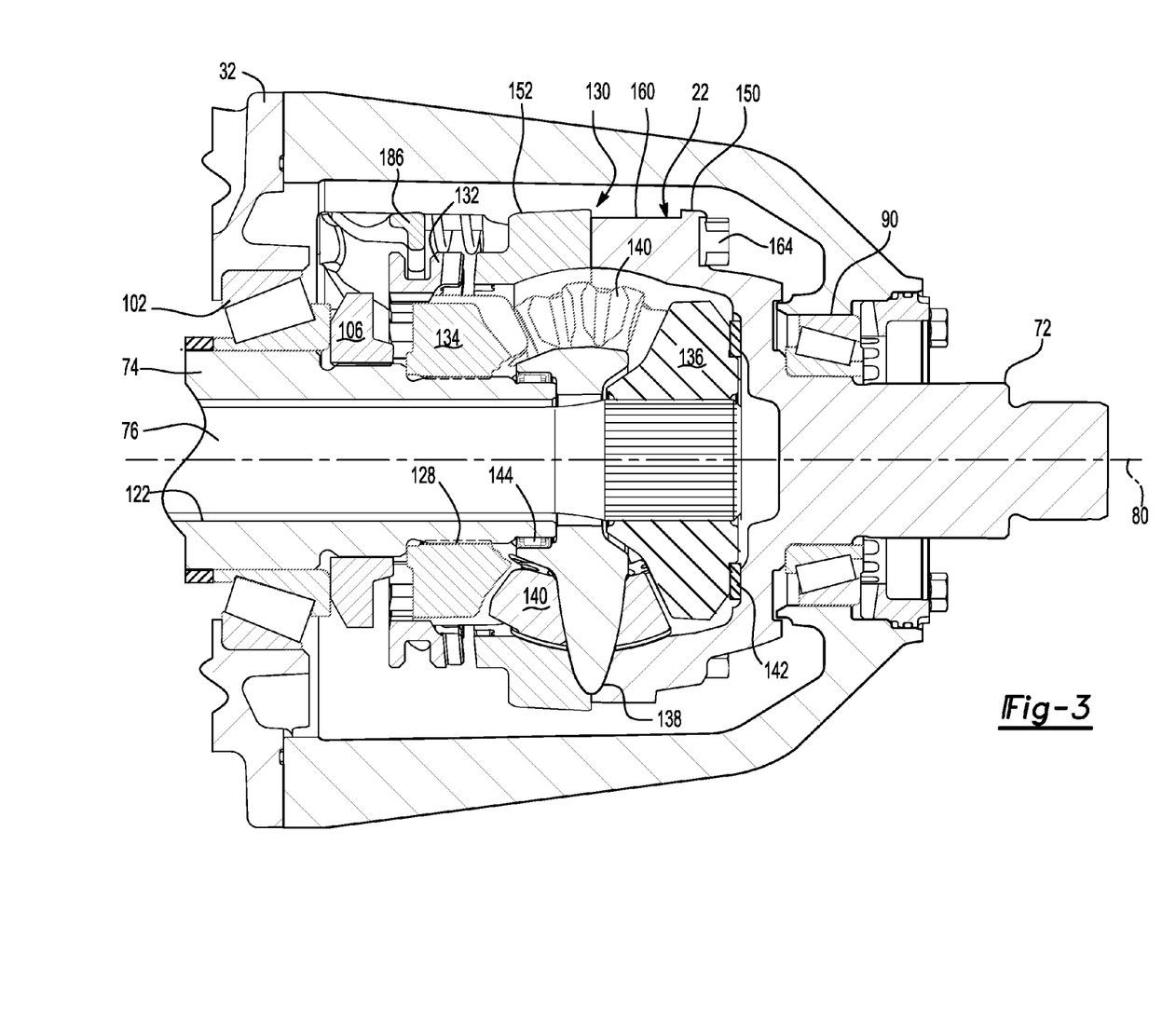
FIG. 3 is a magnified view of a portion of FIG. 2.

Referring to FIGS. 2 and 3, the input shaft 72 may extend along and may be configured to rotate about a first axis 80. For example, the input shaft 72 may be rotatably supported by one or more roller bearing assemblies 90 that may be disposed on the differential carrier 32. The input shaft 72 may be part of the interaxle differential unit 22 or may be operatively connected to the interaxle differential unit 22. For instance, the input shaft 72 may be integrally formed with a case of the interaxle differential unit 22 or may be provided as a separate component that is fixedly coupled to the case in one or more embodiments.

Referring to FIG. 2, the drive pinion 74 may provide torque to a ring gear 100 that may be provided with the differential assembly 24. The drive pinion 74 may extend along and may be configured to rotate about a first axis 80. The ring gear 100 may rotate about a second axis 82. The drive pinion 74 may be coaxially disposed with the input shaft 72 and may be spaced apart from the input shaft 72. The drive pinion 74 may be rotatably supported by one or more roller bearing assemblies 102 that may be disposed on the differential carrier 32. In FIG. 2, two roller bearing assemblies 102 are shown that are spaced apart from each other and separated by a spacer ring 104 that may extend around the drive pinion 74. A preload nut 106 may be threaded onto the drive pinion 74 and may be rotated to exert a desired preload force on the roller bearing assemblies 102. In at least one embodiment, the drive pinion 74 may include a shaft portion 110 and a gear portion 112.

Figure 4:
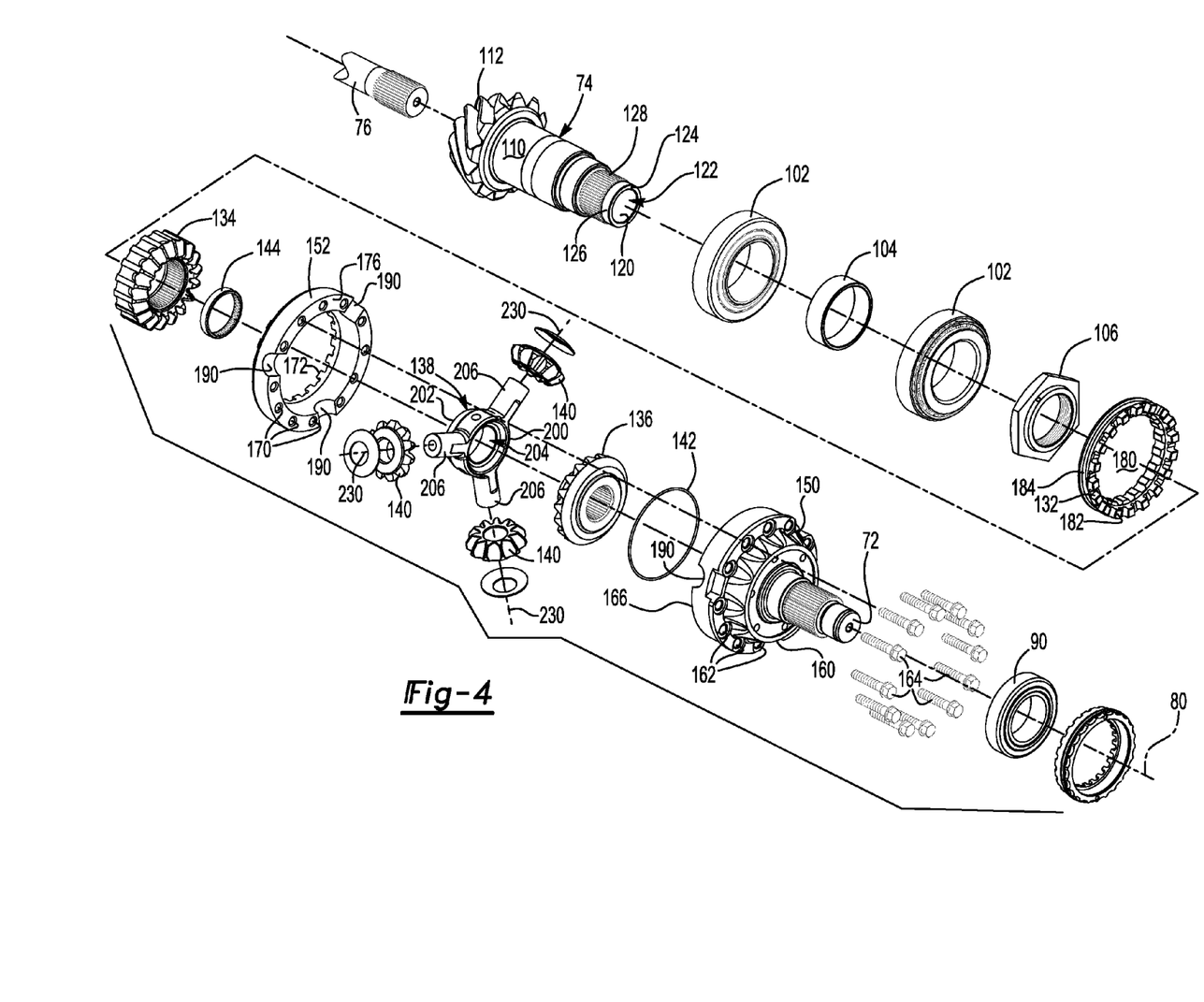
FIGS. 4 and 5 are exploded views of the differential carrier without a differential carrier housing.

Referring to FIGS. 2 and 4, the shaft portion 110 may extend from the interaxle differential unit 22 to the gear portion 112. As is best shown with reference to FIGS. 4 and 6, the shaft portion 110 may include an inner drive pinion surface 120, a drive pinion passage 122, a drive pinion end surface 124, a drive pinion outer surface 126, and a drive pinion spline 128.

Figures 6, 7, 8:
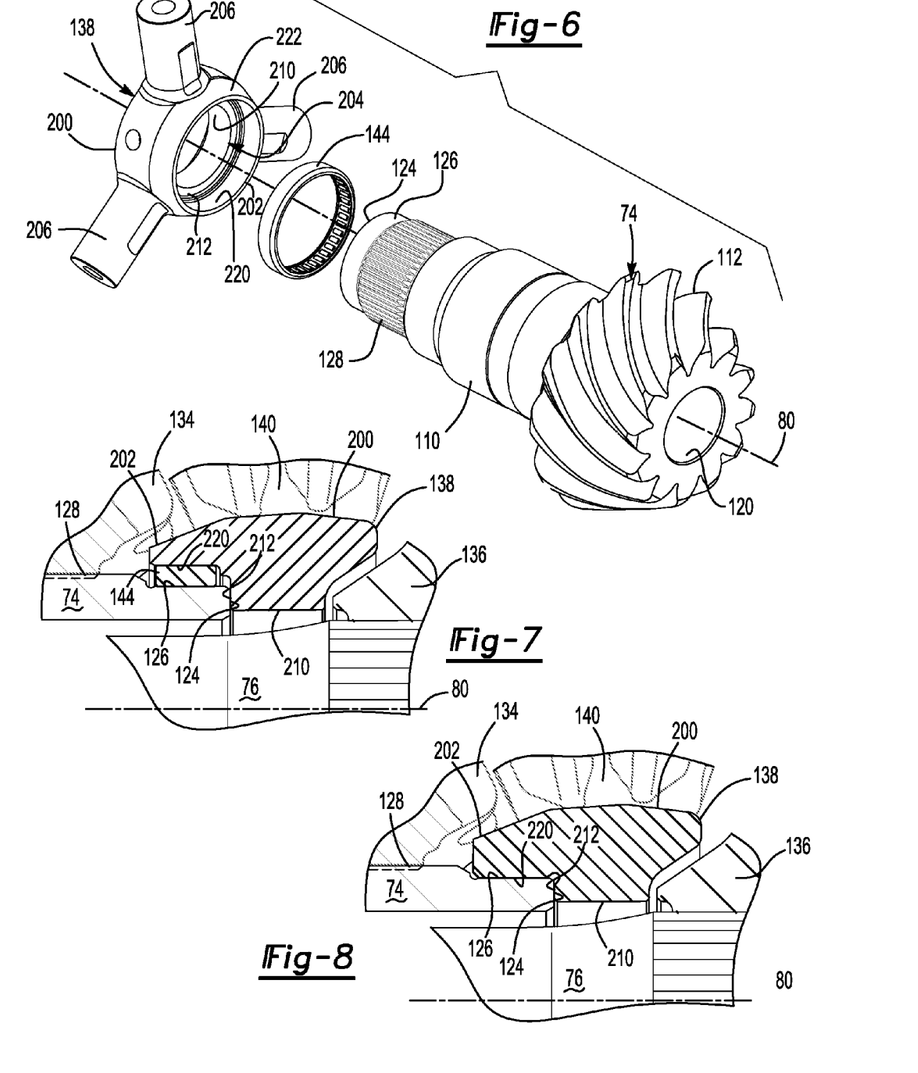
FIG. 6 is an exploded view of a portion of the differential carrier that shows a spider, stabilizer bearing, and drive pinion.
FIG. 7 is a magnified view of a portion of the differential carrier showing a stabilizer bearing configured as a bushing.
FIG. 8 is a magnified view of a portion of the differential carrier without a stabilizer bearing.

The inner drive pinion surface 120 may be spaced apart from the first axis 80 and may be radially disposed with respect to the first axis 80. For example, the inner drive pinion surface 120 may be an inside circumference of the drive pinion 74. The inner drive pinion surface 120 may be spaced apart from and may not engage the output shaft 76. The inner drive pinion surface 120 may extend completely through the drive pinion 74 and may define the drive pinion passage 122.

The drive pinion passage 122 may extend along the first axis 80. The output shaft 76 may extend through the drive pinion passage 122.

The drive pinion end surface 124 may be disposed at an end of the shaft portion 110. The drive pinion end surface 124 may extend from the inner drive pinion surface 120 to the drive pinion outer surface 126. The drive pinion end surface 124 may be received in a spider of the interaxle differential unit 22 as will be discussed in more detail below.

The drive pinion outer surface 126 may extend from the drive pinion end surface 124 toward or to the drive pinion spline 128. In at least one embodiment, the drive pinion outer surface 126 may face away from the first axis 80 and may be an outside circumference of a portion of the shaft portion 110. The drive pinion outer surface 126 may support a stabilizer bearing of the interaxle differential unit 22 as will be discussed in more detail below.

The drive pinion spline 128 may be axially disposed between the drive pinion outer surface 126 and the preload nut 106. The drive pinion spline 128 may include a plurality of teeth. The teeth may be disposed substantially parallel to the first axis 80 and may mate with a corresponding spline on a second side gear of the interaxle differential unit 22 as will be discussed in more detail below.

The gear portion 112 may be disposed at an end of the shaft portion 110. The gear portion 112 may have a plurality of teeth that may mate with corresponding teeth on the ring gear 100. The gear portion 112 may be integrally formed with the shaft portion 110 or may be provided as a separate component that may be fixedly disposed on the shaft portion 110 in one or more embodiments.

Referring to FIGS. 2 and 3, the output shaft 76 may extend along and may be configured to rotate about the first axis 80. For instance, the output shaft 76 may be supported by one or more roller bearings that may be disposed on the housing assembly 20. The output shaft 76 may extend through the drive pinion 74 and the drive pinion passage 122. In addition, the output shaft 76 may extend through a spider of the interaxle differential unit 22 as will be discussed in more detail below. The output shaft 76 may be coupled to the interaxle differential unit 22 at a first end. For example, the output shaft 76 may be fixedly coupled to a second side gear of the interaxle differential unit 22. The output shaft 76 may be fixedly coupled to the output yoke 78 at a second end that may be disposed opposite the first end.

Referring to FIG. 1, the output yoke 78 may facilitate coupling of the output shaft 76 to a second axle assembly that may be disposed in series with the axle assembly 10. For instance, the output yoke 78 may be coupled to a connecting shaft, such as a prop shaft, which in turn may be operatively connected to the second axle assembly.

Referring to FIG. 3, the interaxle differential unit 22 may operatively connect the input shaft 72 to the drive pinion 74 and/or the output shaft 76. The interaxle differential unit 22 may compensate for speed differences between different drive axle assemblies, such as speed differences between the axle assembly 10 and a second axle assembly. As is best shown with reference to FIGS. 3-5, the interaxle differential unit 22 may include a case 130, a clutch collar 132, a first side gear 134, a second side gear 136, a spider 138, a plurality of pinion gears 140, a thrust bearing 142, and a stabilizer bearing 144.

The case 130 may be configured to receive components of the interaxle differential unit 22. In addition, the case 130 may be rotatable about the first axis 80. In at least one embodiment, the case 130 may include a first case portion 150 and a second case portion 152 that may cooperate to at least partially define a cavity. The cavity may at least partially receive the first side gear 134, second side gear 136, spider 138, pinion gears 140, thrust bearing 142, and the stabilizer bearing 144.

Figure 5:
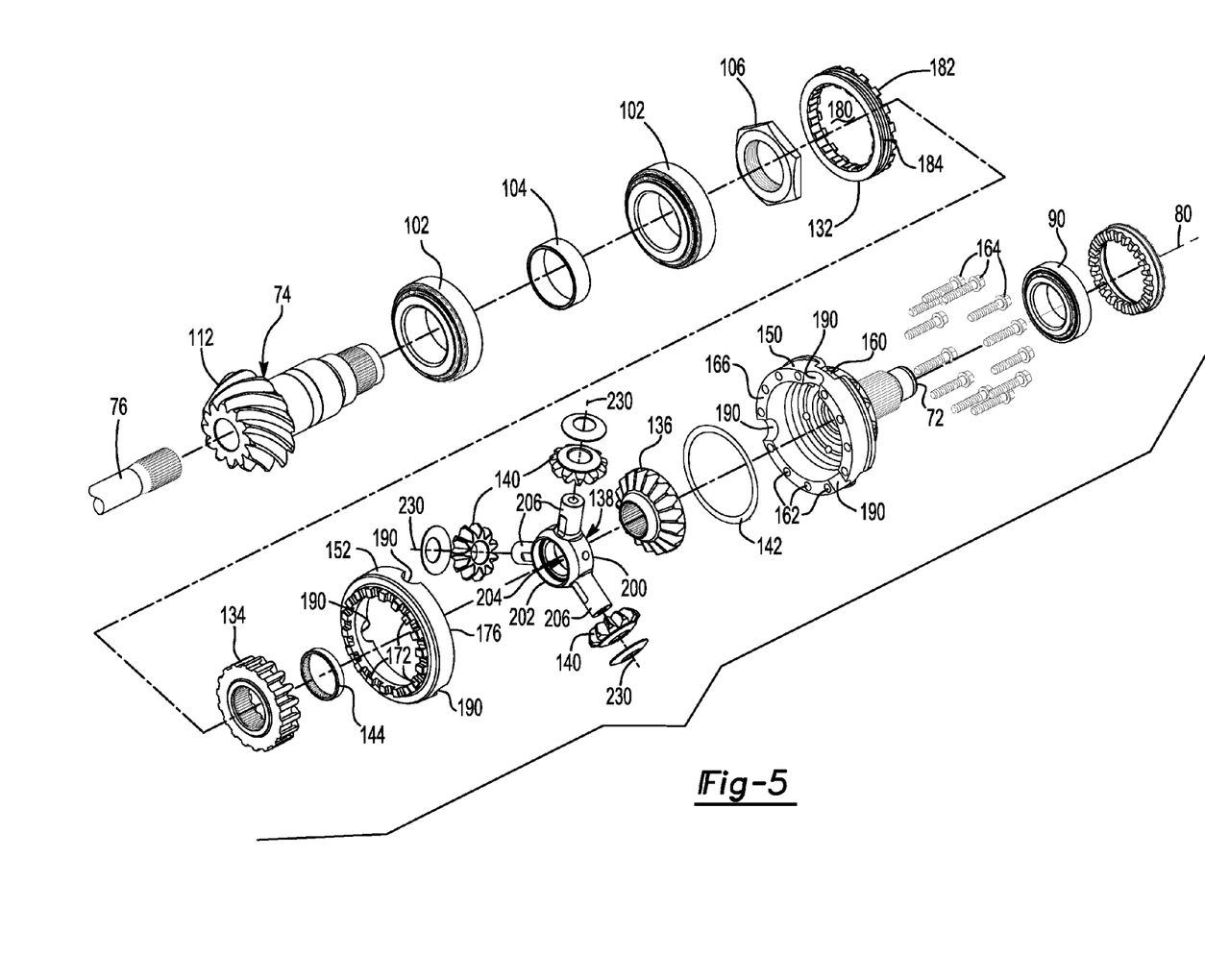

Referring to FIGS. 4 and 5, the first case portion 150 may receive at least a portion of the interaxle differential unit 22. In the configuration shown, the first case portion is configured as a unitary or one piece component that includes the input shaft 72 and a first spider receiving portion 160.

Referring to FIGS. 3-5, the first spider receiving portion 160 may extend away from the first axis 80 and toward the second case portion 152. As is best shown in FIG. 3, the first spider receiving portion 160 may extend around a portion of the interaxle differential unit 22. As is best shown in FIGS. 4 and 5, the first spider receiving portion 160 may include a plurality of fastener holes 162 that may be arranged around the first axis 80. Each fastener holes 162 may be configured as a through hole that may receive a corresponding fastener 164, such as a bolt, that may fixedly couple the first case portion 150 to the second case portion 152. The first spider receiving portion 160 may also include a first end surface 166 that may face toward and may engage the second case portion 152.

The second case portion 152 may be disposed opposite the first case portion 150 and may receive at least a portion of the interaxle differential unit 22. The second case portion 152 may be configured as a ring that may extend around the first axis 80 and may include plurality of fastener holes 170 and a face gear 172.

The fastener holes 170 may be aligned with corresponding fastener holes 162 on the first case portion 150 and may receive a corresponding fastener 164. The fastener holes 170 may extend from a second end surface 176 that may face toward and may engage the first end surface 166.

The face gear 172 may be disposed opposite the second end surface 176. As is best shown in FIG. 5, the face gear 172 may include a plurality of teeth that may be arranged around the first axis 80. The teeth may extend away from the first case portion 150 toward a clutch collar 132.

Referring to FIGS. 3-5, the clutch collar 132, which may also be referred to as a lock collar, may be moveably disposed on the first side gear 134. The clutch collar 132 may move axially or move along the first axis 80 between a retracted position and an extended position as will be discussed in more detail below. As is best shown in FIGS. 4 and 5, the clutch collar 132 may be generally ring-shaped and may include a clutch collar hole 180, a clutch collar face gear 182, and a clutch collar groove 184.

The clutch collar hole 180 may extend through the clutch collar 132 and extend around the first axis 80. The clutch collar hole 180 may receive the first side gear 134. For example, the clutch collar 132 may have a spline that may extend into the clutch collar hole 180 and toward the first axis 80 and may mate with corresponding spline on the first side gear 134. As such, the mating splines may allow the clutch collar 132 to move in an axial direction or along the first axis 80 while inhibiting rotation of the clutch collar 132 about the first axis 80 with respect to the first side gear 134.

The clutch collar face gear 182 may include a set of teeth that may face toward the interaxle differential unit 22. The set of teeth may be arranged around the first axis 80 and may selectively engage the teeth of the face gear 172 of the second case portion 152 depending on the position of the clutch collar 132.

The clutch collar groove 184 may face away from the first axis 80 and may extend around the first axis 80. The clutch collar groove 184 may receive a shift fork 186, which is best shown in FIG. 3, that may operatively connect the clutch collar 132 to an actuator. The actuator may move the clutch collar 132 between and unlocked position and a locked position. The clutch collar face gear 182 may not engage the face gear 172 when the clutch collar 132 is in the unlocked position. As such, the first side gear 134 and drive pinion 74 may be permitted to rotate with respect to the case 130. The clutch collar face gear 182 may engage and mesh with the face gear 172 when the clutch collar 132 is in the locked position, thereby inhibiting the first side gear 134 from rotating with respect to the case 130.

Referring to FIGS. 4 and 5, the first case portion 150 may cooperate with the second case portion 152 to define one or more spider shaft holes 190. The spider shaft holes 190 may be generally disposed extend between the first end surface 166 of the first case portion 150 and the second end surface 176 of the second case portion 152. A spider shaft hole 190 may receive a shaft of the spider 138 as will be discussed in more detail below. In the configuration shown, three spider shaft holes 190 are shown; however, it is contemplated that a greater or lesser number of spider shaft holes 190 may be provided. The spider shaft holes 190 may be spaced apart from each other and may be arranged around the first axis 80. For example, spider shaft holes 190 may be disposed along axes that may be disposed substantially perpendicular to the first axis 80.

Referring to FIGS. 3-5, the first side gear 134 may be disposed on the drive pinion 74. For example, the first side gear 134 may be disposed around the first axis 80 and may have a center bore that may receive the shaft portion 110 of the drive pinion 74. The center bore may include a spline that may receive and engage the drive pinion spline 128. As such, the first side gear 134 may not rotate about the first axis 80 with respect to the drive pinion spline 128 and the drive pinion 74.

The second side gear 136 may be disposed on the output shaft 76. For example, the second side gear 136 may be disposed around the first axis 80 and may have a center bore that may receive the output shaft 76. The center bore may include a spline that may receive and engage a corresponding spline on the output shaft 76. As such, the second side gear 136 may not rotate about the first axis 80 with respect to the output shaft 76.

Referring to FIGS. 3-5, the spider 138 may be fixedly positioned with respect to the case 130 and may be rotatably disposed on the drive pinion 74. The spider 138 may or may not engage the drive pinion 74 as will be discussed in more detail below. The spider 138 may be spaced apart from and may not engage the output shaft 76. As such, the spider 138 may be rotatable with respect to the output shaft 76. In at least one configuration, spider 138 may include an annular spider body 200, an annular spider flange 202, a spider hole 204, and one or more spider shafts 206.

The annular spider body 200 may be axially positioned between the input shaft and the drive pinion 74. The annular spider body 200 may at least partially define the spider hole 204. As is best shown in FIG. 6, the annular spider body 200 may include an inner spider body surface 210 and a spider step surface 212.

The inner spider body surface 210 may face toward the first axis 80 and may extend around the first axis 80. The inner spider body surface 210 may be an inside circumference of the annular spider body 200.

The spider step surface 212 may extend from the inner spider body surface 210 away from the first axis 80. As such, spider step surface 212 may extend to or toward the annular spider flange 202. The spider step surface 212 may be disposed adjacent to the drive pinion end surface 124 and may be spaced apart from the drive pinion end surface 124.

Referring to FIGS. 4-6, the annular spider flange 202 may extend from the annular spider body 200 in a direction that may extend away from the input shaft 72. As such, the annular spider flange 202 may extend in an axial direction toward the drive pinion 74 but may not engage the drive pinion 74. The annular spider flange 202 may at least partially define the spider hole 204. In addition the first side gear 134 may extend around at least a portion of the annular spider flange 202. As is best shown in FIGS. 6 and 7, the annular spider flange 202 may include an inner spider flange surface 220 and an outer spider flange surface 222.

The inner spider flange surface 220 may face toward the first axis 80 and may extend around the first axis 80. The inner spider flange surface 220 may be disposed further from the first axis 80 than the inner spider body surface 210 and the drive pinion spline 128. In addition, the spider step surface 212 may extend from the inner spider flange surface 220 toward or to the inner spider body surface 210.

The outer spider flange surface 222 may be disposed opposite the inner spider flange surface 220. The outer spider flange surface 222 may face away from the first axis 80 and may be disposed in a nonparallel relationship with the inner spider flange surface 220. Such a configuration may help provide clearance between the spider 138 and the first side gear 134.

Referring to FIGS. 5 and 6, the spider hole 204 may extend through the annular spider body 200 and the annular spider flange 202. As such, the spider hole 204 may be a through hole that may extend through the spider 138. The output shaft 76 may extend through the spider hole 204 and hence through the annular spider body 200 and the annular spider flange 202. Moreover, the output shaft 76 may be spaced apart from the spider 138 and may not engage the annular spider body 200 or the annular spider flange 202. The drive pinion 74 may be received by the portion of the spider hole 204 defined by the annular spider flange 202 but may not be received in the annular spider body 200 or portion of the spider hole 204 defined by the annular spider body 200 in one or more embodiments.

Referring to FIGS. 4-6, one or more spider shafts 206 may extend from the annular spider body 200. In the configuration shown, three spider shafts 206 are provided; however, it is contemplated that a greater or lesser number of spider shafts 206 may be provided in one or more embodiments. The spider shafts 206 may be integrally formed with the annular spider body 200 or may be provided as separate components that are fixed to the annular spider body 200. Each spider shaft 206 may extend from the annular spider body 200 in a direction that extends away from the first axis 80 and away from the spider hole 204. For example, each spider shaft 206 may extend along a spider shaft axis 230 that may be disposed substantially perpendicular to the first axis 80. In addition, an end of each spider shaft 206 may be received in a corresponding spider shaft hole 190 of the case 130. As is best shown in FIGS. 4-6, the spider shafts 206 may have a generally cylindrical configuration.

Referring to FIGS. 3-5, a pinion gear 140 may be rotatably disposed on a corresponding spider shaft 206. Each pinion gear 140 may have teeth that may mesh with teeth on the first side gear 134 and the second side gear 136.

Referring to FIGS. 3 and 4, the thrust bearing 142 may be disposed between the case 130 and the second side gear 136. The thrust bearing 142 may rotatably support the second side gear 136 with respect to the first case portion 150.

Referring to FIGS. 3-6, the stabilizer bearing 144 may rotatably support the spider 138. The stabilizer bearing 144 may be received in the annular spider flange 202 and may extend from the drive pinion outer surface 126 to the inner spider flange surface 220. As such, the stabilizer bearing 144 may be disposed further from the first axis 80 than the inner spider body surface 210. The stabilizer bearing 144 may be axially positioned between the first side gear 134 and the second side gear 136 such that the stabilizer bearing 144 may be spaced apart from and may not engage the first side gear 134 or the second side gear 136. For example, the stabilizer bearing 144 may extend from the spider step surface 212 toward or to the drive pinion spline 128.

The stabilizer bearing 144 may be provided in various configurations. In the configuration shown in FIGS. 3-6, the stabilizer bearing 144 is configured as a roller bearing assembly that may include a plurality of rolling elements that may be disposed between an inner race and an outer race. The rolling elements may have any suitable configuration. For instance, the rolling elements may be configured as needle bearings in one or more embodiments.

Referring to FIG. 7, another stabilizer bearing configuration is shown. In FIG. 7, the stabilizer bearing 144 is configured as a bushing that does not have rolling elements, but that permits rotation of drive pinion 74 with respect to the spider 138.

Referring to FIG. 8, another configuration is shown in which the stabilizer bearing 144 may be omitted and the spider 138 may be directly rotatably supported on the drive pinion 74. In such a configuration, the drive pinion outer surface 126 and the inner spider flange surface 220 may be machined such that the inner spider flange surface 220 extends around and engages the drive pinion outer surface 126 in a manner that permits rotation of drive pinion 74 with respect to the spider 138 while providing adequate support for the spider 138.

The stabilizer bearing 144 or direct engagement of the drive pinion outer surface 126 and the inner spider flange surface 220 as shown in FIG. 8 may help support the interaxle differential unit 22 and help maintain alignment of the input shaft 72, case 130, spider 138, and the pinion gears 140 with respect to the first axis 80. Such support and alignment may reduce vibration of the interaxle differential unit 22 while still allowing the interaxle differential unit 22, drive pinion 74, and output shaft 76 to rotate. The stabilizer bearing 144 or direct engagement configuration may also help limit or inhibit deflection of the output shaft 76 with respect to the first axis 80, such as deflection or movement toward the inner drive pinion surface 120 of the drive pinion 74, which may also help maintain alignment, improve stability, and reduce vibration. In configurations where the stabilizer bearing 144 is omitted or when there is no direct engagement between drive pinion outer surface 126 and the inner spider flange surface 220, the output shaft 76 may vibrate under light loads or at low rotational speeds in which one or more side gears of the interaxle differential unit 22 may not be fully seated by thrust loads imparted during rotation of the interaxle differential unit 22. These vibrations may be transmitted from the axle assembly 10 to the drive shaft or other driveline components. Such vibrations are undesirable since they may increase wear of driveline components and may be felt by vehicle occupants.

Referring to FIG. 2, the differential assembly 24 may be disposed in the center portion 40 of the housing assembly 20. The differential assembly 24 may transmit torque to the vehicle traction wheel assemblies and permit the traction wheel assemblies to rotate at different velocities. An abbreviated discussion of the operation of the differential assembly 24 follows with reference to FIGS. 1 and 2, beginning with the input yoke 70 shown in FIG. 1.

The input yoke 70 may be coupled to a vehicle drivetrain component, such as a drive shaft, that may be coupled to an output of a vehicle transmission or transfer case, which in turn may receive torque from a vehicle power source, such as an engine or motor. Alternatively, the input yoke 70 may be operatively connected to an output of another axle assembly. The input yoke 70 may be operatively connected to the input shaft 72, which in turn may be operatively connected to the drive pinion 74. The drive pinion 74 may provide torque to the ring gear 100 of the differential assembly 24. The differential assembly 24 may be operatively connected to the axle shafts 26 and may permit the axle shaft 26 to rotate at different rotational speeds in a manner known by those skilled in the art. As such, the differential assembly 24 may receive torque via the ring gear 100 and provide torque to the axle shafts 26.

Referring to FIGS. 1 and 2, the axle shafts 26 may transmit torque from the differential assembly 24 to corresponding traction wheel assemblies. For example, two axle shafts 26 may be provided such that each axle shaft 26 extends through a different arm portion 42 of axle housing 30. The axle shafts 26 may extend along and may be rotated about the second axis 82 by the differential assembly 24. Each axle shaft 26 may have a first end and a second end. The first end may be operatively connected to the differential assembly 24. The second end may be disposed opposite the first end and may be operatively connected to a wheel end assembly that may have a wheel hub that may support a wheel. As shown in FIG. 1, an axle flange 250 may be disposed proximate the second end of the axle shaft 26 and may facilitate coupling of the axle shaft 26 to the wheel hub.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an input shaft;
   a drive pinion that is spaced apart from the input shaft;
   an output shaft that extends through the drive pinion;
   an interaxle differential unit that operatively connects the input shaft to the drive pinion and the output shaft, the interaxle differential unit including a first side gear that is fixedly disposed on the drive pinion and a spider that is rotatable with respect to the output shaft and through which the output shaft extends, wherein the spider is supported by the drive pinion and is rotatable with respect to the drive pinion; and
   a stabilizer bearing that extends from the drive pinion to the spider and is spaced apart from and does not engage the first side gear, wherein the stabilizer bearing rotatably supports the spider.

2. The axle assembly of claim 1 wherein the stabilizer bearing is disposed in a case of the interaxle differential unit.

3. The axle assembly of claim 1 wherein the drive pinion has an inner drive pinion surface that defines a drive pinion passage through which the output shaft extends, wherein the stabilizer bearing inhibits movement of the output shaft toward the inner drive pinion surface.

4. The axle assembly of claim 1 wherein the stabilizer bearing is a roller bearing assembly.

5. The axle assembly of claim 1 wherein the stabilizer bearing is a bushing.

6. The axle assembly of claim 1 wherein the stabilizer bearing is received in the spider.

7. The axle assembly of claim 1 wherein the drive pinion engages the spider.

8. An axle assembly comprising:
   an input shaft that is rotatable about an axis;
   a drive pinion that is spaced apart from the input shaft and is rotatable about the axis;
   an output shaft that extends through the drive pinion and is rotatable about the axis;
   an interaxle differential unit that operatively connects the input shaft to the drive pinion and the output shaft, the interaxle differential unit including a spider that includes:
      an annular spider body that is axially positioned between the input shaft and the drive pinion; and
      an annular spider flange that extends from the annular spider body away from the input shaft; and
   a stabilizer bearing that is received in the annular spider flange and extends from the annular spider flange to the drive pinion, wherein the stabilizer bearing rotatably supports the spider.

9. The axle assembly of claim 8 wherein the output shaft extends through the drive pinion and the spider and does not engage the drive pinion and the spider.

10. The axle assembly of claim 8 wherein the output shaft extends through the annular spider body and the annular spider flange.

11. The axle assembly of claim 8 wherein the annular spider flange extends in an axial direction toward the drive pinion and does not engage the drive pinion.

12. The axle assembly of claim 8 wherein the drive pinion is received in the annular spider flange and is not received in the annular spider body.

13. The axle assembly of claim 12 wherein the annular spider body has an inner spider body surface that faces toward and extends around the axis, the annular spider flange has an inner spider flange surface that faces toward and extends around the axis, and the inner spider flange surface is disposed further from the axis than the inner spider body surface.

14. The axle assembly of claim 13 wherein the stabilizer bearing is disposed further from the axis than the inner spider body surface.

15. The axle assembly of claim 13 wherein the spider includes an outer spider flange surface that is disposed opposite the inner spider flange surface, wherein the outer spider flange surface is disposed in a nonparallel relationship with the inner spider flange surface.

16. The axle assembly of claim 13 wherein the spider further comprises a spider step surface that extends from the inner spider body surface to the inner spider flange surface, and the drive pinion further comprises a drive pinion end surface that is disposed adjacent to the spider step surface.

17. The axle assembly of claim 16 wherein the interaxle differential unit further comprises:
a first side gear that is disposed on the drive pinion;
a second side gear that is disposed on the output shaft; and
a pinion gear that is rotatably disposed on the spider and that meshes with the first side gear and the second side gear;
wherein the stabilizer bearing is axially positioned between the first side gear and the second side gear and does not engage the first side gear and the second side gear.

18. The axle assembly of claim 17 wherein the first side gear extends around at least a portion of the annular spider flange.

19. The axle assembly of claim 17 wherein the drive pinion has a drive pinion spline that is received in and engages the first side gear and a drive pinion outer surface that extends between the drive pinion end surface and the drive pinion spline, wherein the stabilizer bearing is disposed on the drive pinion outer surface.

20. The axle assembly of claim 19 wherein the inner spider flange surface is disposed further from the axis than the drive pinion spline.

* * * * *